United States Patent [19]

Verboom et al.

[11] Patent Number: 5,758,903
[45] Date of Patent: Jun. 2, 1998

[54] ADJUSTMENT DEVICE FOR ADJUSTING A MOUNTING DEVICE BETWEEN TWO FLANGES OF A PIPELINE SYSTEM

[75] Inventors: Dick Verboom, Bleskensgraff; Willem de Roo, Sliedrecht, both of Netherlands

[73] Assignee: Krohne Messtechnik GmbH & Co. KG, Germany

[21] Appl. No.: 639,867

[22] Filed: Apr. 26, 1996

[30] Foreign Application Priority Data

Apr. 29, 1995 [DE] Germany .................. 195 15 237.9

[51] Int. Cl.$^6$ .................................................. F16L 55/00
[52] U.S. Cl. ........................... 285/18; 285/368; 285/31; 285/23
[58] Field of Search ........................ 285/18, 23, 412, 285/368, 31

[56] References Cited

U.S. PATENT DOCUMENTS

| 2,517,391 | 8/1950 | Ernestus | 285/368 |
|---|---|---|---|
| 3,082,022 | 3/1963 | Moore | 285/368 |
| 3,406,986 | 10/1968 | Jennings | 285/368 |
| 3,643,983 | 2/1972 | Luteman | 285/31 |
| 3,830,527 | 8/1974 | Naiten et al. | 285/31 |
| 3,875,969 | 4/1975 | Sgourakes et al. | 285/31 |
| 3,876,337 | 4/1975 | Landfors | 285/368 |
| 4,637,641 | 1/1987 | Kennedy, Jr. | 285/368 |

FOREIGN PATENT DOCUMENTS

| 1074336 | 1/1960 | Germany | 285/23 |
|---|---|---|---|
| 1019691 | 2/1966 | United Kingdom | 285/23 |

*Primary Examiner*—Eric K. Nicholson
*Attorney, Agent, or Firm*—Cesari and McKenna, LLP

[57] ABSTRACT

An adjustment device for adjusting a mounting device between two flanges of a pipeline system, wherein the two flanges can be connected via preferably bolt-shaped connection means. The adjustment device consists of an expansion element that can be expanded basically by an inflowing medium wherein the expansion element in its expanded state is adjacent to the mounting device and the connecting means.

10 Claims, 4 Drawing Sheets

ADJUSTMENT DEVICE FOR ADJUSTING A MOUNTING DEVICE BETWEEN TWO FLANGES OF A PIPELINE SYSTEM

The invention concerns an adjustment device for adjusting a mounting device between two flanges of a pipeline system, wherein the two flanges can be connected, preferably by bolt-shaped connection means.

BACKGROUND OF THE INVENTION

Mounting or installation devices for use in a system of pipes, for example a meter for measuring process parameters like a volume flow meter and accessories, are basically designed to be mounted between two flanges in the pipeline system. However, these flanges comply with various standards, such as DIN, ANSI and JIS, in various pipeline systems. For standardization purposes, flangeless devices that can be clamped between the flanges of two sections of the pipeline system are increasingly being used today. In this type of mounting, the flanges are connected via connection means that run longitudinally to the mounting device. Bolts are generally used as the means of connection, but they can have various diameters, depending on the situation and the standard used. When a basically tube-shaped mounting or installation device is mounted, there is, consequently, more or less a lot of play between the casing of the mounting or installation device and the preferably bolt-shaped means of connection. This play depends first on the type of flange in the respective pipeline system and the diameter of the preferably bolt-shaped means of connection, and then, on the design of the mounting device. But for optimal function, in most mounting devices, the axis of the mounting device must run absolutely coaxial to the axis of the pipeline system. There are adjustment devices already known in the state of the art that provide this type of coaxial path.

In the known adjustment devices, adjustment is by means of two eccentric rings arranged around the casing of the device to be mounted. By turning the rings, the preferably bolt-shaped connection means are pressed to the outside on the edge of the flange holes for the connection means, and the mounting device is simultaneously adjusted in relation to the pipeline system.

The known adjustment devices are problematic from many standpoints. First of all, the known adjustment devices can only be used once. After the device is mounted in the pipeline system, the known adjustment devices are caught within the means of connection. Since the known adjustment devices are, therefore, connected to the mounting device for their whole lives, like the mounting devices, under certain circumstances, they must also be resistant to extreme environmental conditions like, for example, high or low temperatures, which adds to the cost. Furthermore, the known adjustment devices have to be adjusted both to the type of flange used and to the diameter of the mounting device. Also, the known adjustment devices cannot be used in mounting devices with irregularly shaped casings or only under special conditions. Finally, the casing of the mounting device is often damaged when the known adjustment devices are used.

SUMMARY OF THE INVENTION

The task of this invention is, therefore, to provide an adjustment device that is easy to handle, flexible and inexpensive.

The invention accordingly comprises the features of construction, combination of elements, and arrangement of parts which will be exemplified in the construction hereinafter set forth, and the scope of the invention will be indicated in the claims.

In general, the task presented and described is solved by the invention by having the adjustment device consist basically of an expansion element that can be expanded by the inflow of a medium, and by the fact that in the expanded state, the expansion element is adjacent to the mounting device and the connecting elements. The adjustment device of the invention, in its non-expanded state, is inserted between the mounting device and the surrounding, preferably bolt-shaped connection means over as large an area as possible. Through the subsequent expansion of the expansion element by the influx of a medium, like for example a gas or liquid, the basically tube-shaped mounting device is adjusted between the means of connection with sufficient pressure from the medium flowing in, so that the axis of the mounting or installation device is made coaxial to the axis of the pipeline system. After the mounting device has been adjusted in this way, it can, if necessary, still be put in an appropriate mounting position by turning on its axis. Next, the means of connecting the two flanges is pulled on or tensioned and the mounting device is clamped between the two flanges of the pipeline system. After the mounting device is clamped on, the medium is allowed to flow out of the expansion element and can be removed from the space between the mounting device and the means of connection after the expansion element has relaxed.

Thus, adjustment device of the invention, for one thing, does not remain on the mounting device and so has multiple uses and does not have to adjust to extreme environmental conditions when the mounting device is used; for another thing, it guarantees a much more flexible adjustment to the type of flange or means of connection and mounting devices used and is still especially gentle on the casing of the mounting device. Compared to the known adjustment devices, the adjustment device of the invention can also be produced much more inexpensively.

One initial advantageous embodiment of the adjustment device of the invention is characterized by the fact that the expansion element is made of a material that is as inelastic as possible. This additional measure guarantees that relatively large forces are produced between the mounting device and the means of connection, since the pressure produced cannot be relieved due to expansion of the expansion element at places where it is adjacent to the mounting device or the means of connection.

An especially user-friendly embodiment of the adjustment device of the invention is characterized by the fact that the expansion element has essentially a sleeve-like collar. This type of design of the expansion element guarantees that the element can be placed around the respective mounting device with a flick of the wrist.

One especially flexible embodiment of the adjustment device of the invention is characterized by the fact that the expansion element is hose-like and by the fact that the length of the hose-like expansion element is at least a multiple of the circumference of the mounting device. This guarantees that the expansion element can be used with all conceivable mounting devices due to the fact that it is wound around the mounting device at regular intervals.

When such a hose-like expansion element is used repeatedly with a particular mounting or installation device, it is advantageous to incorporate the expansion element into a sleeve. This will guarantee very simple handling of the adjustment device of the invention.

The most simple and inexpensive model of the tube-shaped expansion element is characterized by the fact that it is closed tightly on its first end. Alternatively to this, the tube-shaped expansion element can be designed in such a way that it can be closed at any place desired. The tube-shaped expansion element may be closed at any desired place along its length advantageously by any conventional clamping device. Compared to the expensive closure on the first end of the tube-shaped expansion element, the closure at any other place on the expansion element has the advantage that the medium flowing into the tube-shaped expansion element does not flow into an unused section of the tube-shaped expansion element no longer needed for adjustment.

An expansion element designed in a tube shape is an especially advantageous embodiment in that the medium flows into the tube-shaped expansion element from a second end. Therefore, there is no need to provide separate access to the expansion element.

One especially advantageous embodiment of the adjustment device of the invention is characterized by the fact that gas from a high-pressure cartridge can be used as the medium. This guarantees especially easy handling of the adjustment device regardless of the site. Of course, the expansion element can also conceivably be connected to a high-pressure air system or water line near the installation.

Other objects will, in part, be obvious and will, in part, appear hereinafter.

The invention accordingly comprises the features of construction, combination of elements and the arrangement of parts which will be exemplified in the following detailed description, and the scope of the invention will be indicated in the claims.

BRIEF DESCRIPTION OF THE DRAWINGS

There are many ways of designing and building the adjustment device of the invention. Please refer, on the one hand, to the patent claims subordinate to patent claim 1, and on the other, to the description of the preferred embodiments, along with the drawings, in which:

DESCRIPTION OF THE PREFERRED EMBODIMENTS

Figure 1:
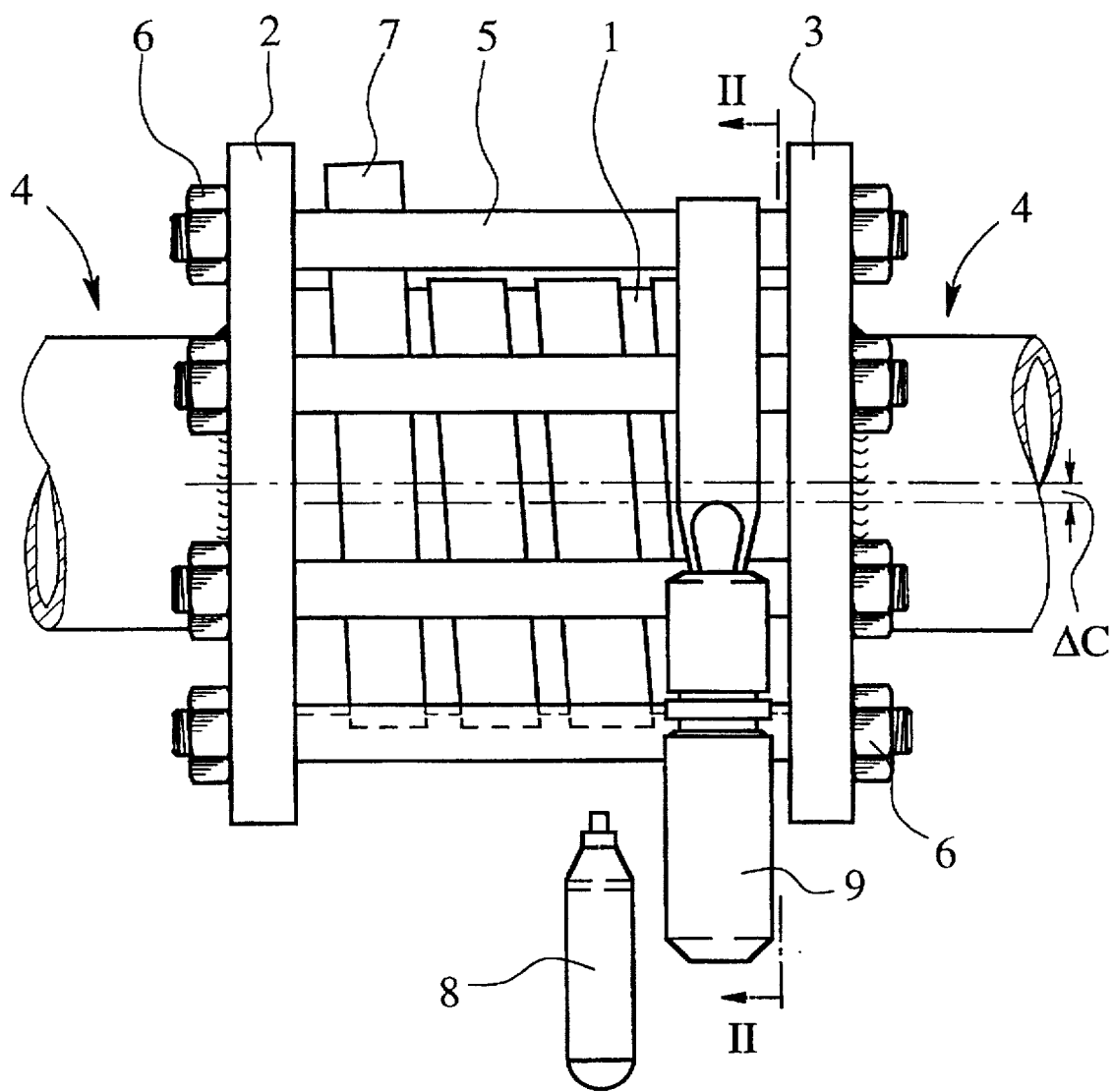
FIG. 1 shows a side view of a pipeline system in which a mounting device is to be mounted by means of one embodiment of the adjustment device according to the invention.

FIG. 1 of the drawings shows an example of an adjustment device for adjusting a mounting or installation device 1 that is basically tube-shaped between two flanges 2, 3 of a pipeline system 4, wherein the two flanges 2, 3 are connected by bolt-shaped connection means 5. The bolt-shaped means of connection 5 have raised nuts 6 on their ends.

The embodiment of the adjustment device 1 shown in FIG. 1 basically consists of a tube-shaped expansion element 7 that can be expanded by a medium flowing into it. FIG. 1 shows the tube-shaped expansion element 7 in the non-expanded state. The tube-shaped expansion element 7 is shown wound around the mounting device 1 at regular intervals. Winding the tube-shaped expansion element 7 over the entire length of the mounting device 1 guarantees even adjustment of the mounting device 1 over its entire length. A common high-pressure cartridge 8 filled with carbon dioxide is shown in FIG. 1 as the source of the medium for expansion of the tube-shaped expansion element 7. This high pressure cartridge 8 is inserted in a holder 9, also shown, and is opened by screwing on the holder 9.

Figure 2:
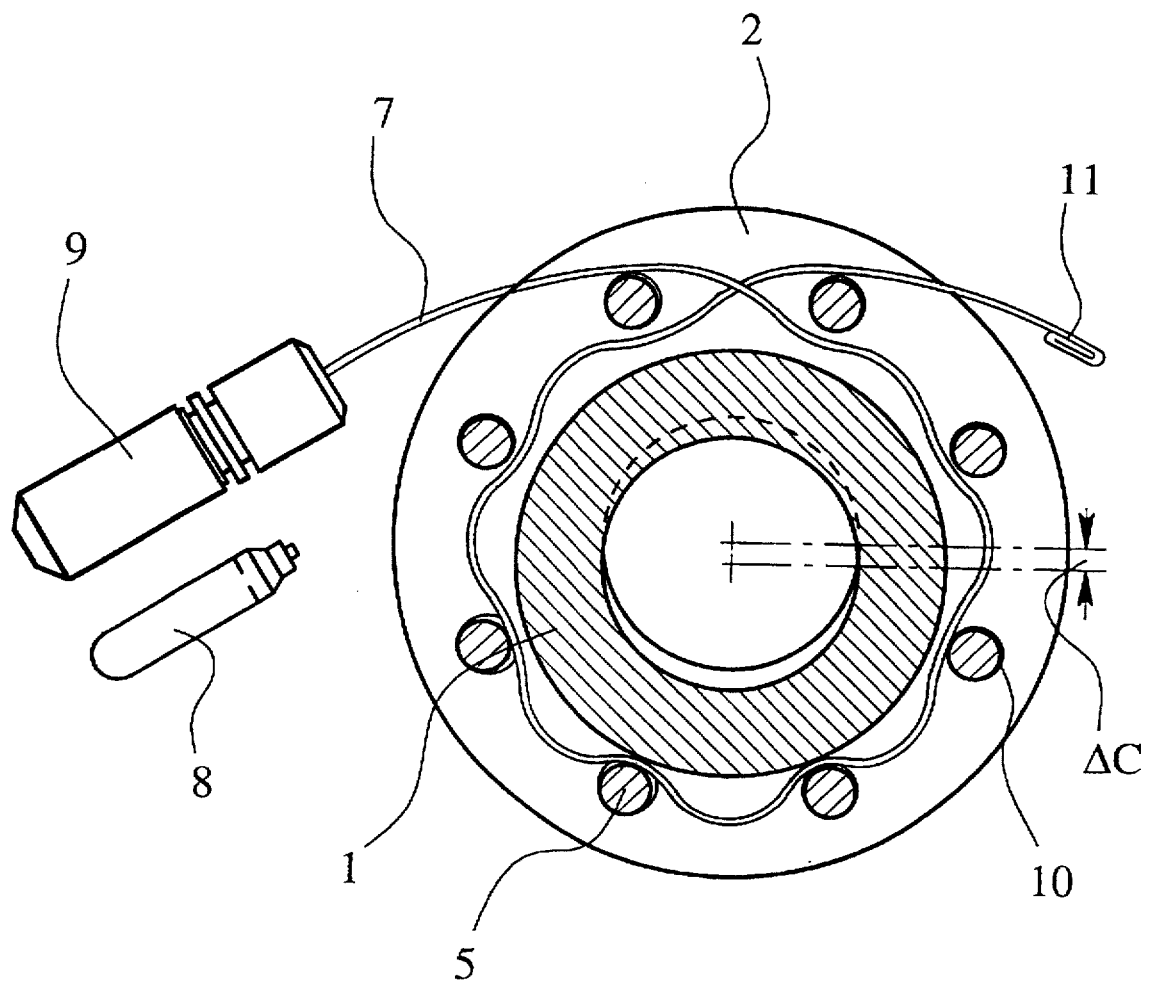
FIG. 2 shows a section through the pipeline system and the adjustment device taken along line II—II of FIG. 1, before adjustment.

FIG. 2 shows one embodiment of the adjustment device of the invention sectioned along the line II—II of FIG. 1 with the tube-shaped expansion element 7 shown, as in FIG. 1, in the non-expanded state. FIG. 2 also shows very clearly that the axes of the mounting device 1 and the pipeline system 4 are not coaxial, but are offset at a distance $\Delta C$ from one another. FIG. 2 shows clearly that the bolt-shaped means of connection 5, because of their weights, lie on the bottoms of the flange holes 10. FIG. 2 shows in addition that the tube-shaped expansion element 7 is closed tightly at its first end 11 so that that end is fluid tight.

Figure 3:
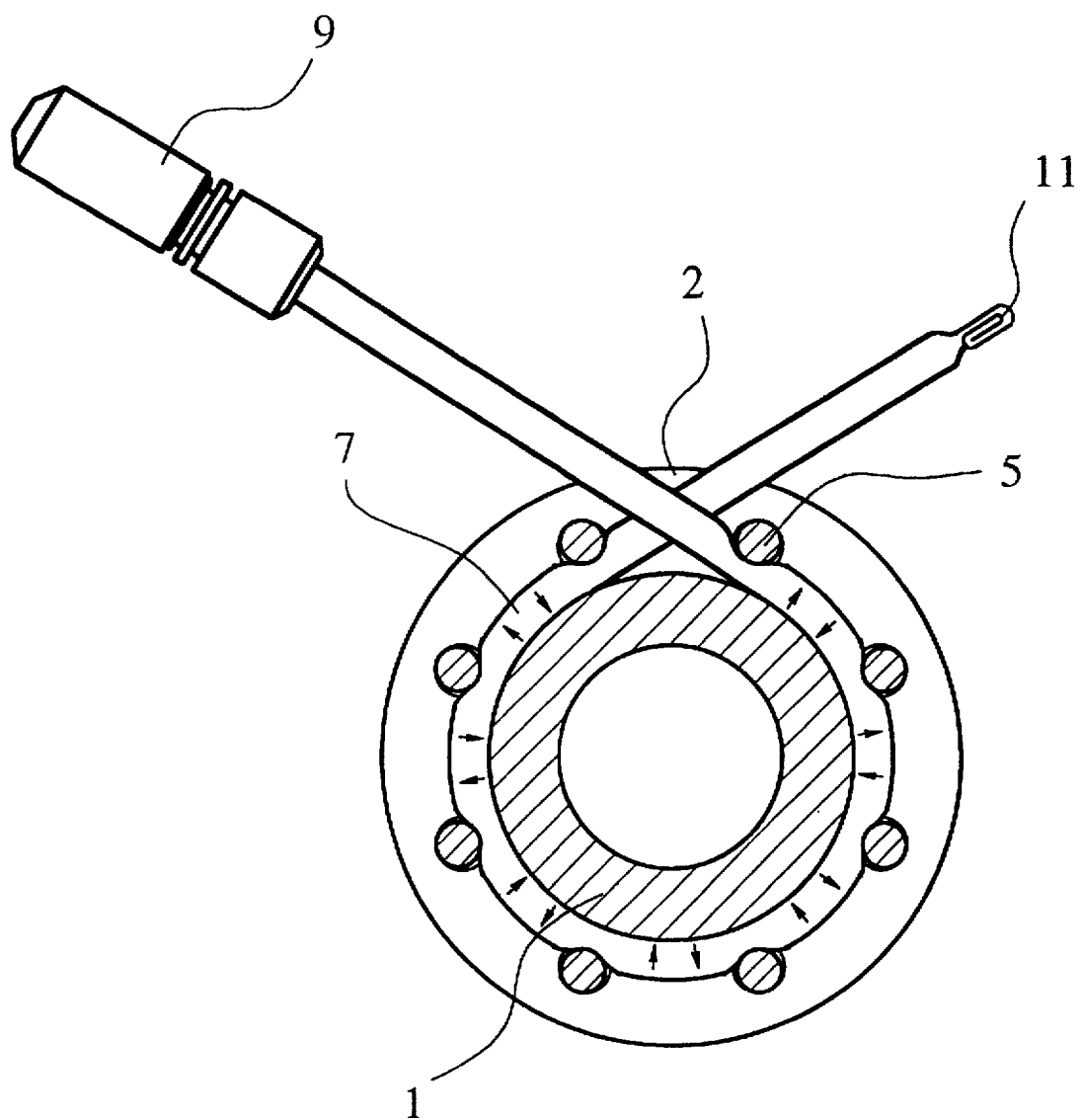
FIG. 3 shows a section through the pipeline system and the adjustment device taken along line II—II of FIG. 1, after adjustment.

FIG. 3 now shows that embodiment of the adjustment device according to the invention in its expanded state at the section already shown in FIG. 2. As can be seen directly, the axes of the mounting device 1 and the pipeline system 4 are now coaxial when the expansion element 7 is in the expanded state. This is achieved by having the mounting device 1 automatically adjusted by the forces, shown by arrows, caused via the tube-shaped expansion element 7 between the mounting device 1 and the bolt-shaped means of connection 5. Here, the bolt-shaped connection means 5 are pressed radially to the outside on the flange holes 10 by the forces that occur. It is now understandable that this adjustment is made independently of the embodiment of the flange selected and the potentially varying diameter of the bolt-shaped means of connection 5. In the state shown in FIG. 3, the bolt-shaped connection means 5 are now pulled on or tensioned and the mounting device 1 is attached between the flanges 2, 3. After this attachment, the holder 9 can be opened, where upon the carbon dioxide gas in the tube-shaped expansion element 7 flows out and thus the tube-shaped expansion element 7 is released. Here it should be mentioned that a commercial garden hose with a crosswise braided reinforcement, for example, is excellent for the tube-shaped expansion element 7.

Figure 4:
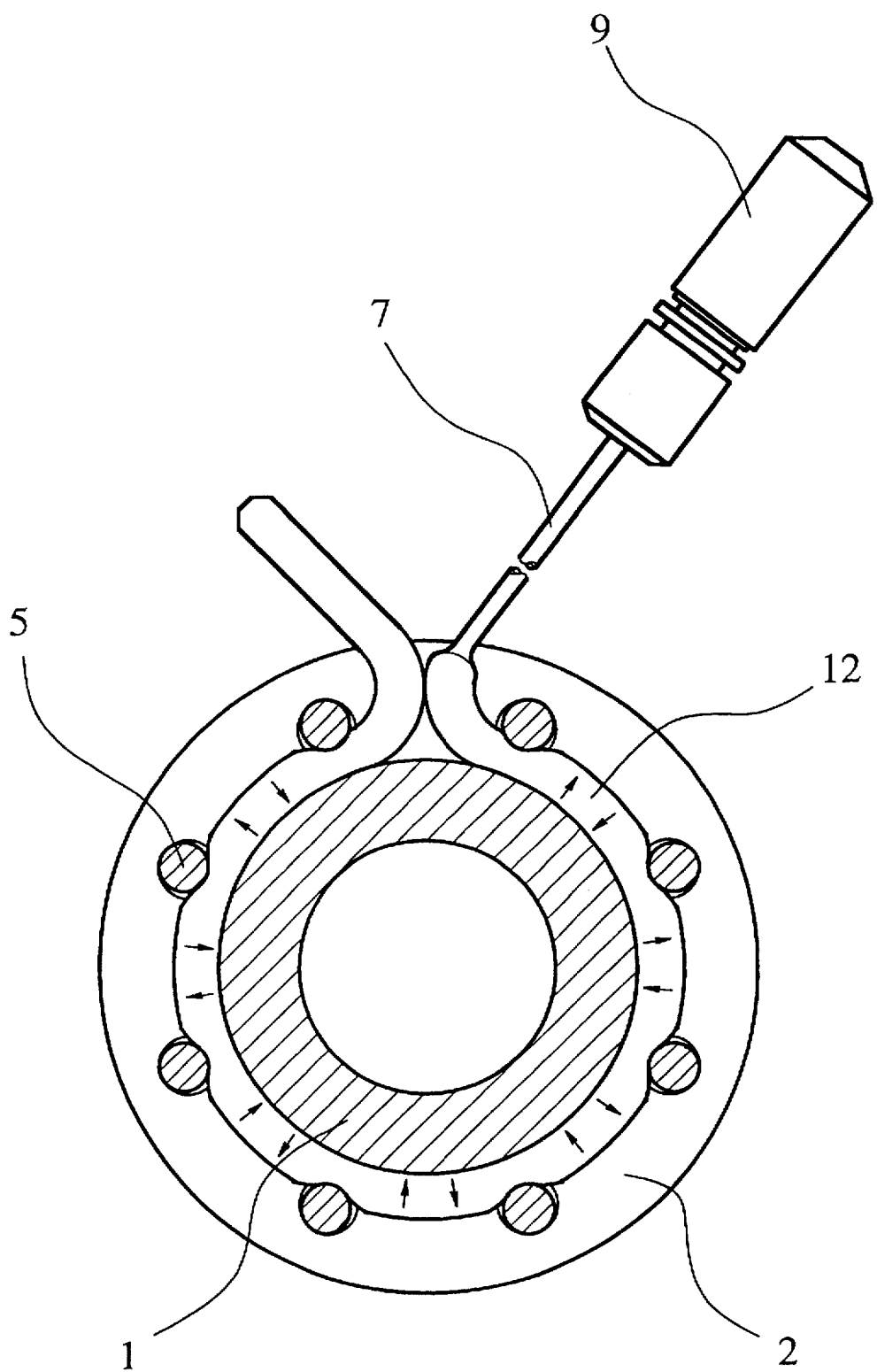
FIG. 4 is a view similar to FIG. 3 showing a second embodiment of the adjustment device, after adjustment.

FIG. 4 shows a second embodiment of the adjustment device after adjustment, in the same mounting arrangement illustrated in FIG. 3. This embodiment differs in that its expansion element 7 is laid in a meandering manner inside a flexible sleeve 12.

For the sake of completeness, it should finally be mentioned that the adjustment device of the invention can, of course, also be used with mounting devices that have flanges themselves.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. An adjustment device for adjusting a mounting device (1) between two flanges (2, 3) of a pipeline system (4), wherein the two flanges (2, 3) are connected via bolt-shaped connection means (5), characterized by the fact that the adjustment device comprises of an expansion element (7) that is expandable by a medium flowing therein and by the fact that the expansion element (7) in its expanded state is adjacent to the mounting device (1) and the connecting means (5).

2. The adjustment device according to claim 1, characterized by the fact that the expansion element (7) consists of a material that is as inelastic as possible.

3. The adjustment device according to claim 1 or 2, characterized by the fact that the expansion element (7) has essentially a sleeve-like shape.

4. The adjustment device according the claim 1 or 2, characterized by the fact that the expansion element (7) is hose-like and the length of the expansion element (7) is at least a multiple of the circumference of the mounting device (1).

5. The adjustment device according to claim 4, characterized by the fact that the expansion element (7) is incorporated into a sleeve (12).

6. The adjustment device according to claim 4, characterized by the fact that the expansion element (7) is closed tightly at a first end (11).

7. The adjustment device according to claim 4, characterized by the fact that the expansion element (7) can be closed at any desired place along its length.

8. The adjustment device according to claim 7, characterized by the fact that the expansion element (7) is closed by a clamping device.

9. The adjustment device according to any one of claim 4, characterized by the fact that the medium flows into the expansion element (7) from a second end thereof.

10. The adjustment device according to any one of claim 1 or 2, characterized by the fact that gas in a high-pressure cartridge can be used as the medium.

* * * * *